Jan. 21, 1947. C. D. ANDERSON ET AL 2,414,579
ROCKET LAUNCHER FOR AIRCRAFT
Filed Oct. 20, 1944 2 Sheets-Sheet 2
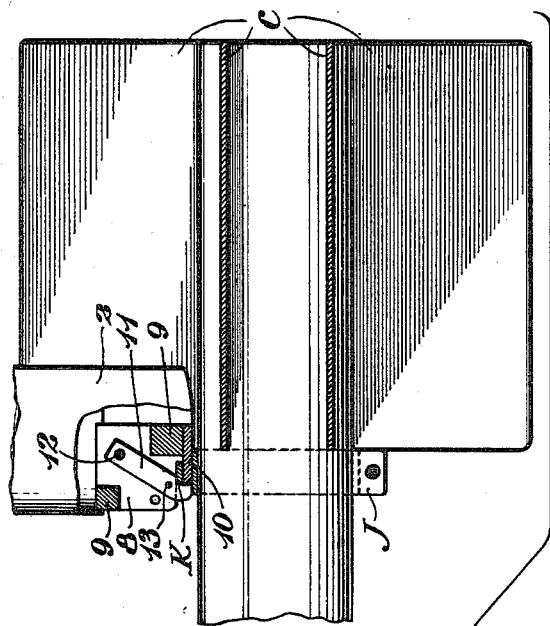
Fig. 4.
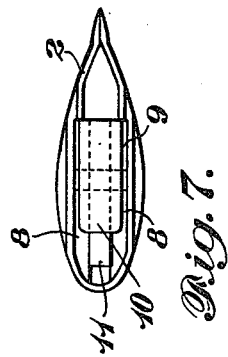
Fig. 7.
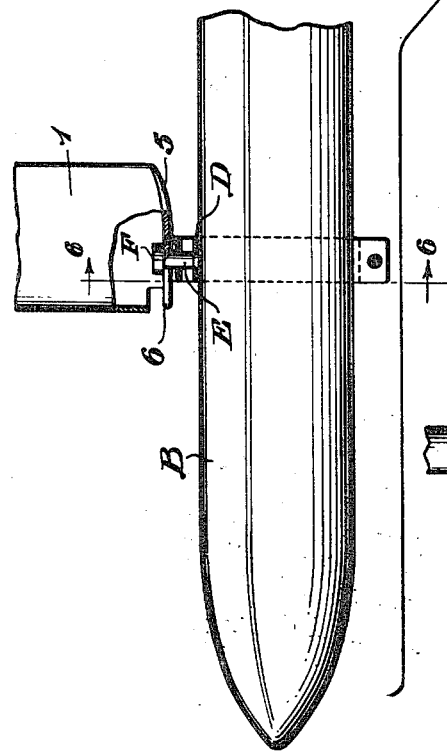
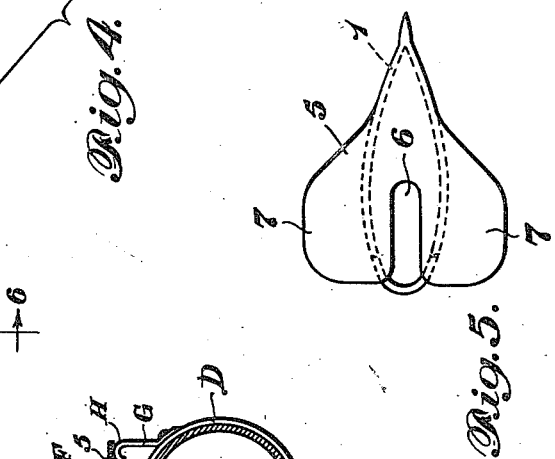
Fig. 5.
Fig. 6.
CARL D. ANDERSON
ROBERT B. LEIGHTON
CHARLES H. WILTS
ALDON L. MELZIAN
By W. Glenn Jones
Attorney Patented Jan. 21, 1947

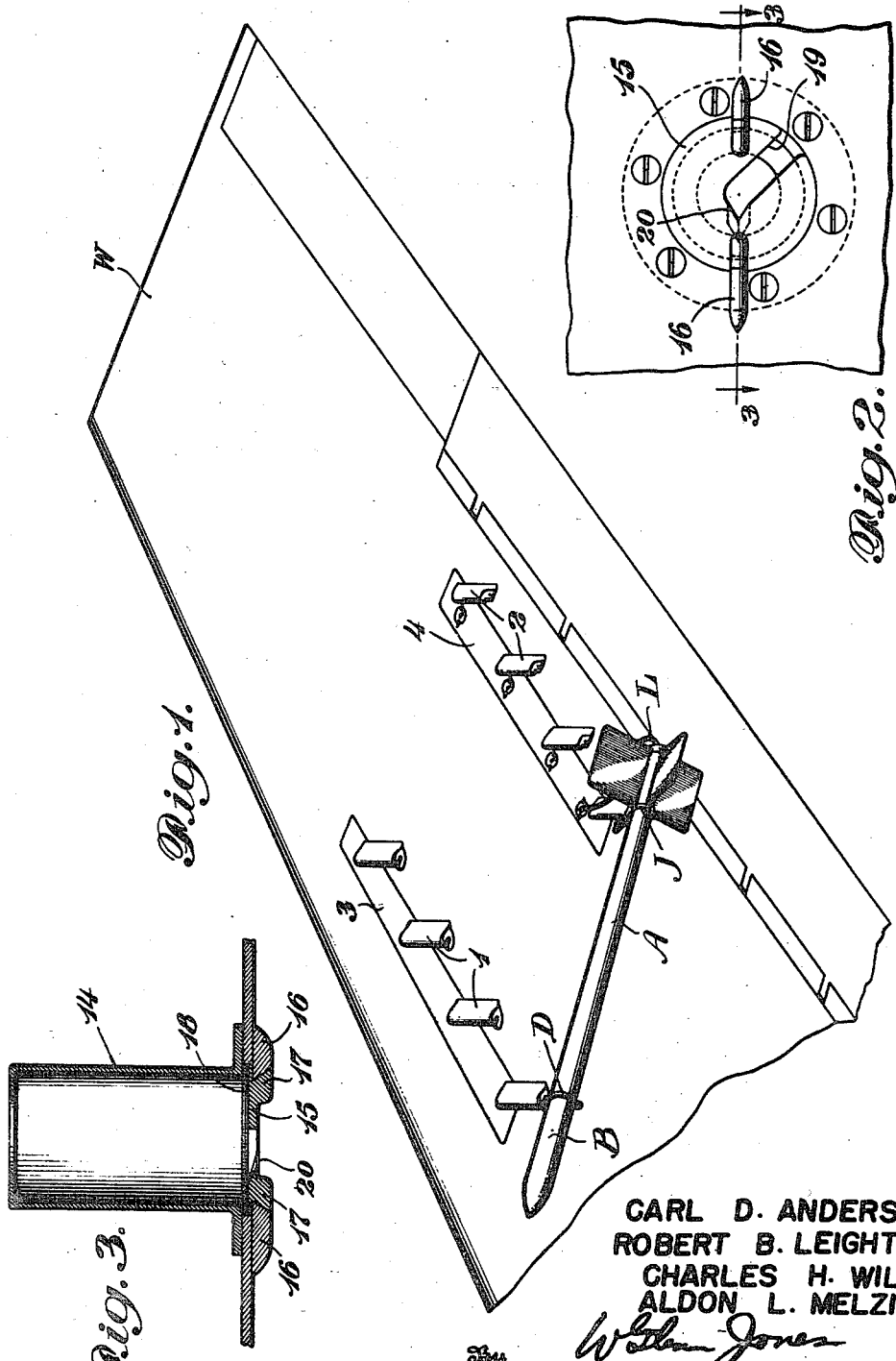

2,414,579

UNITED STATES PATENT OFFICE 2,414,579

ROCKET LAUNCHER FOR AIRCRAFT

Carl D. Anderson, Robert B. Leighton, and Charles H. Wilts, Pasadena, and Aldon L. Melzian, Altadena, Calif., assignors to United States of America, as represented by the Secretary of the Navy Application October 20, 1944, Serial No. 559,614

2 Claims. (Cl. 89—1.7)

This invention relates to rocket launchers for aircraft.

One of the objects of this invention is to provide a rocket launcher which offers minimum drag and has only nominal weight, the rocket launcher being particularly adapted for installation on high speed, high performance fighter craft, and consisting merely of small, streamlined posts which project downward from the aircraft wing.

Another object is to provide a rocket launcher wherein guide tracks are virtually eliminated, the rocket being free of the launcher after only a nominal forward travel, the necessary velocity to maintain stable flight being supplied by the forward velocity of the aircraft rather than the velocity attained by the rocket relative to its launcher.

Another object is to provide a rocket launcher for aircraft wherein the ignition cables for the rockets are severed by knives as the rockets begin their flight to minimize any jerking which might cause the rocket to deviate from its course.

Another object is to provide a rocket launcher for aircraft which is particularly simple in construction, easily installed and does not interfere with normal operations of the aircraft.

Another object is to provide a rocket launcher which is adapted to fire high speed rockets of the type herein illustrated.

With the above and other objects in view as may appear hereinafter, reference is directed to the accompanying drawings in which:

Figure 1 is a fragmentary perspective view showing the under side of the airplane wing with several of the launchers installed thereon, one of them supporting a rocket.

Figure 2 is a fragmentary bottom view of the ignition wire receptacle.

Figure 3 is a fragmentary sectional view thereof.

Figure 4 is a fragmentary side view of the forward and rear launcher posts, partly in section, with a rocket mounted thereon, showing the manner in which the rocket is supported therein by the forward and rear lug bands.

Figure 5 is a bottom view of the forward launcher post.

Figure 6 is a fragmentary view of the forward lug band which connects the rocket to the forward post, as shown, Figure 7 is a bottom view of the rear launcher post.

The launcher is adapted to be mounted on the under side of airplane wing W and is intended to launch rocket motors of the type illustrated in the drawings. The rocket comprises a motor tube A at the forward end of which is mounted a head B which may be designed for armour piercing, fragmentation or other specific uses. The rear end of the motor tube is provided with radiating fins C.

Near the head B the motor tube is provided with a forward lug band D which is provided with an upwardly directed stem E terminating in a head F. A bracing strip G is secured to the band and to the stem E. The bracing strip is shaped to form shoulders H on either side of the stem E. The motor tube is provided adjacent the fins C with a rear lug band J which is provided with a small loop K at its upper side.

Each launcher unit comprises a forward suspension post 1 and a rearward suspension post 2. The launcher units are preferably arranged in sets, several forward suspension posts being attached to a forward mounting plate 3 and the rearward suspension posts similarly attached to a rear mounting plate 4. The mounting plates are suitably secured to the under side of the wing W. Each forward suspension post 1 is in the form of a streamlined tube which is provided at its lower end with an end plate 5. The end plate is provided with a slot 6 extending to its forward edge and adapted to receive the stem E. The suspension post is notched to clear the head F so that the head may be slipped rearwardly along the slot 6. The end plate 5 is provided with lateral ears 7 which are engaged by the shoulders H to prevent side sway of the rocket.

Each rear suspension post 2 is likewise formed of streamlined tubing. The lower and forward side is notched to receive a latching mechanism. The latching mechanism includes two rectangular plates 8 welded within the suspension post and separated by spacers 9 located in the upper, forward and lower, rearward corners thereof. The lower spacer 9 is provided with a forwardly directed tongue 10 which is adapted to fit into the loop K of the rear lug band J. Between the side plates 8 is mounted a latch arm 11 which is journaled on a latch pin 12. The lower end of the latch arm is adapted to under-hang the forward or extended end of the tongue 10. A shear wire 13 extends through the side plates 8 and latch arm 11 to hold the latch arm against movement away from the tongue 10 and thereby hold the rocket in place as shown in Figure 9.

The rocket motor is adapted to be set off electrically and is provided with ignition wires L which extend from the rear or nozzle end of the motor tube. Adjacent each rear post 2, the rear mounting plate 4 is provided with a terminal socket housing 14, shown best in Figures 2 and 3. The housing 14 is secured to the upper or inner side of the rear mounting plate 4 and is arranged to carry a terminal socket not shown. The rear mounting plate is provided with holes which reggister with the housings 14 and are adapted to receive cover plates 15. Each cover plate is rotatable and is retained in place by a pair of lugs 16 welded or otherwise formed on the rear mounting plate. The cover plate is provided with ears 17 which mate with the lugs 16 and the cover plate is backed with a plate spring 18. The cover plate is relieved slightly in line with the ears 17 so that when the ears 17 and lugs 16 are in alinement the cover plate is latched in place. The cover plate is provided with a radiating slot 19 terminating in a central opening, one side of which is sharpened to form a knife edge 20. The location of the knife edge is such that when the rocket moves forward from the launcher posts its ignition wire is readily severed by the knife edge 20.

The launcher posts support the rocket for only an inch or less of its forward travel. This is made possible by the fact that the rocket is launched from aircraft when the aircraft is in rapid forward flight. The air stream around the rocket and its fins is sufficient to stabilize the rocket so that it is in condition for stable flight before receiving the impetus from the rocket jet. Flight tests have shown that the accuracy of rockets launched from this so-called "zero" length launcher compares favorably with the accuracy obtained from launchers of the type using guide tracks.

What is claimed is:

1. A rocket and launcher therefor, comprising: a forward post depending from an aircraft wing, a slotted end plate at the lower end of said post; a rearward post depending from said aircraft wing, a forwardly directed tongue at its lower extremity, and a latch coacting with said tongue; a rocket including a forward suspension means fitting said end plate, and a rearward suspension means fitting said tongue and retained thereon by said latch; and a shearable means for initially securing said latch thereby initially securing said rocket with respect to said posts.

2. An electrically ignited rocket motor and a launcher therefor, comprising: a pair of launcher posts depending from an aircraft wing; an electrically operated rocket having an ignition cord extending therefrom; connecting elements on said rocket and said posts for initially supporting said rocket, said elements being disengageable upon slight forward movement of said rocket relative to said posts; shearable means for holding said elements in engagement, said shearable means giving way in response to the thrust resulting from operation of said rocket motor; and an ignition cord receptacle set in said aircraft wing adjacent one of said launcher posts and including means for severing said cord as said rocket travels from said posts.

CARL D. ANDERSON.
ROBERT B. LEIGHTON.
CHARLES H. WILTS.
ALDON L. MELZIAN.